(12) United States Patent
Kay

(10) Patent No.: US 10,104,081 B2
(45) Date of Patent: Oct. 16, 2018

(54) PRIVILEGED STATIC HOSTED WEB APPLICATIONS

(71) Applicant: GOOGLE INC., Mountain View, CA (US)

(72) Inventor: Erik Kay, Emerald Hills, CA (US)

(73) Assignee: GOOGLE LLC, Mountain View, CA (US)

( * ) Notice: Subject to any disclaimer, the term of this patent is extended or adjusted under 35 U.S.C. 154(b) by 111 days.

(21) Appl. No.: 14/522,897

(22) Filed: Oct. 24, 2014

(65) Prior Publication Data

US 2015/0180875 A1    Jun. 25, 2015

Related U.S. Application Data

(60) Provisional application No. 61/918,145, filed on Dec. 19, 2013.

(51) Int. Cl.
*H04L 29/06* (2006.01)
*G06F 21/12* (2013.01)
(Continued)

(52) U.S. Cl.
CPC ........ *H04L 63/10* (2013.01); *G06F 17/30887* (2013.01); *G06F 21/128* (2013.01); (Continued)

(58) Field of Classification Search
CPC ...... G06F 21/51; G06F 21/121; G06F 21/577; G06F 21/128; G06F 21/629; (Continued)

(56) References Cited

U.S. PATENT DOCUMENTS

| 8,181,254 | B1 | 5/2012 | Kay et al. |
| 8,935,755 | B1 * | 1/2015 | Kay .......................... G06F 8/61 726/1 |

(Continued)

FOREIGN PATENT DOCUMENTS

WO    2015/095310 A1    6/2015

OTHER PUBLICATIONS

International Search Report and Written Opinion for International Application No. PCT/US2014/070829, dated Mar. 11, 2015, 13 pages.

(Continued)

*Primary Examiner* — Tae K Kim
(74) *Attorney, Agent, or Firm* — Brake Hughes Bellermann LLP

(57) ABSTRACT

A method can include receiving a static web application at a trusted server, validating assurance characteristics of the static web application, and upon successful validation of the static web application, providing access to the static web application via a URL that identifies the static web application at a trusted server location. The static web application, when executed on the browser running on the client device, can be granted at least one permission to utilize local resources of the client device during execution of the static web application by the browser. Upon receiving a change to an object of the static web application, the validating of the assurance characteristics of the static web application, as a whole, can be performed before the change to the object is made accessible via the URL.

20 Claims, 7 Drawing Sheets

(51) Int. Cl.
*G06F 21/56* (2013.01)
*G06F 21/62* (2013.01)
*H04W 12/08* (2009.01)
*H04W 12/12* (2009.01)
*G06F 17/30* (2006.01)
*H04L 29/08* (2006.01)

(52) U.S. Cl.
CPC ............ *G06F 21/56* (2013.01); *G06F 21/629* (2013.01); *H04L 63/102* (2013.01); *H04L 63/123* (2013.01); *H04L 63/145* (2013.01); *H04L 63/1441* (2013.01); *H04W 12/08* (2013.01); *H04W 12/12* (2013.01); *H04L 67/02* (2013.01)

(58) Field of Classification Search
CPC ....... G06F 2221/033; G06F 2221/2141; G06F 17/30861
See application file for complete search history.

(56) References Cited

U.S. PATENT DOCUMENTS

| 2007/0208751 | A1* | 9/2007 | Cowan | G06Q 30/02 |
| 2009/0222925 | A1* | 9/2009 | Hilaiel | G06F 21/53 726/25 |
| 2009/0288141 | A1* | 11/2009 | Khachaturov | G06F 21/577 726/3 |
| 2012/0110674 | A1 | 5/2012 | Belani et al. | |
| 2013/0097706 | A1* | 4/2013 | Titonis | G06F 21/56 726/24 |
| 2013/0111560 | A1 | 5/2013 | Arenas et al. | |
| 2013/0117807 | A1* | 5/2013 | Kay | G06F 21/121 726/1 |
| 2013/0247030 | A1* | 9/2013 | Kay | H04L 67/34 717/178 |

OTHER PUBLICATIONS

"Javascript—Managing JS and CSS for a static HTML web application—Programmers Stack Exchange", retrieved on Mar. 3, 2015 from http://programmers.stackexchange.com/questions/171745/managing-js-and-css-for-a-static-html-web-application, Oct. 29, 2012, 4 pages.

International Preliminary Report on Patentability received for PCT Patent Application No. PCT/US2014/070829, dated Jun. 30, 2016, 8 pages.

* cited by examiner

PRIVILEGED STATIC HOSTED WEB APPLICATIONS

CROSS-REFERENCE TO RELATED APPLICATIONS

This application claims priority under 35 U.S.C. § 119(e)(1), to U.S. Provisional Application Ser. No. 61/918,145, filed on Dec. 19, 2013, the entire contents of which are incorporated herein by reference.

FIELD

Embodiments relate to hosted web applications.

BACKGROUND

Generally, applications are either hosted by a network or remote server or installed on a client computing device. Hosted applications have the advantage of being flexible in that a change to the application can affect all users of the application. However, hosted applications are typically not considered secure because of the nature of the Internet. Installed applications have the advantage of being secure in that they are typically standalone (e.g., disconnected) from the Internet. However, installed applications are not flexible in that a change to the application typically requires a new installation of the application.

SUMMARY

Accordingly, in the below description example embodiments disclose mechanisms for detecting setting changes based on changes in cryptographic hashes. Further, disclosed are mechanisms for changing settings back to default values and determining confidence levels associated with malicious setting changes.

In a general aspect, a method can include receiving a static web application at a trusted server, validating assurance characteristics of the static web application, and upon successful validation of the static web application, providing access to the static web application via a uniform resource locator (URL) that identifies the static web application at a trusted server location within a public Internet and that can be used to navigate to the static web application from a browser running on a client device. The static web application, when executed on the browser running on the client device, can be granted at least one permission to utilize local resources of the client device during execution of the static web application by the browser. Upon receiving a change to an object of the static web application, the validating of the assurance characteristics of the static web application, as a whole, can be performed before the change to the object is made accessible via the URL.

Implementations can include one or more of the following features. For example, the static web application can be granted the at least one permission based on a prior verification and vetting process based on at least one permission that the web application seeks to declare. The static web application can be granted the at least one permission based on a prior maliciousness ranking and a threshold value. The static web application can contain all of the resources necessary to execute the application on the client computing device and wherein code needed to execute the application by the client computing device is not dynamically generated. The method can further include hosting the static web application on the trusted server. The hosting can include providing access to the static web application, and code associated with the static web application, to a web crawler.

For example, the validating of the assurance characteristics of the static web application can include verifying an object of the static web application does not include an object identified as at least one of a malware, a virus, and a Trojan. The validating of the assurance characteristics of the static web application can include verifying a trustworthiness ranking of a developer of the static web application. The updating of the static web application can include replacing objects of the static web application with a revalidated entire application. Prior to requesting at least one permission to utilize local resources of the client device during execution of the static web application by the browser the static web application can execute, on the client device, without permission to utilize local resources of the client device.

In another general aspect, a server includes a memory configured to store a static web application, a verification module configured to validate assurance characteristics of the static web application, and an application server, upon successful validation of the static web application, configured to provide access to the static web application via a uniform resource locator (URL) that identifies the static web application at a trusted server location within a public Internet and that can be used to navigate to the static web application from a browser running on a client device. The static web application, when executed on the browser running on the client device, is granted at least one permission to utilize local resources of the client device during execution of the static web application by the browser. The verification module, upon receiving a change to an object of the static web application, is further configured to repeat the validating of the assurance characteristics of the static web application, as a whole, before the change to the object is made accessible via the URL.

Implementations can include one or more of the following features. For example, the static web application can be granted the at least one permission based on a prior verification and vetting process based on at least one permission that the web application seeks to declare. The static web application can be granted the at least one permission based on a prior maliciousness ranking and a threshold value. The static web application can contain all of the resources necessary to execute the application on the client computing device and wherein code needed to execute the application by the client computing device is not dynamically generated. The static web application can be hosted on the server. The hosting can include providing access to the static web application, and code associated with the static web application, to a web crawler.

For example, the validating of the assurance characteristics of the static web application can include verifying an object of the static web application does not include an object identified as at least one of a malware, a virus, and a Trojan. The validating of the assurance characteristics of the static web application can include verifying a trustworthiness ranking of a developer of the static web application. The updating of the static web application can include replacing objects of the static web application with a revalidated entire application. Prior to requesting at least one permission to utilize local resources of the client device during execution of the static web application by the browser the static web application can execute, on the client device, without permission to utilize local resources of the client device.

In still another general aspect, a non-transitory computer-readable storage medium having stored thereon computer executable program code which, when executed on a computer system, causes the computer system to perform steps. The steps include receiving a static web application at a trusted server, validating assurance characteristics of the static web application, and upon successful validation of the static web application, providing access to the static web application via a uniform resource locator (URL) that identifies the static web application at a trusted server location within a public Internet and that can be used to navigate to the static web application from a browser running on a client device. The static web application, when executed on the browser running on the client device, can be granted at least one permission to utilize local resources of the client device during execution of the static web application by the browser. Upon receiving a change to an object of the static web application, the validating of the assurance characteristics of the static web application, as a whole, can be performed before the change to the object is made accessible via the URL.

Implementations can include one or more of the following features. For example, the static web application can be granted the at least one permission based on a prior verification and vetting process based on at least one permission that the web application seeks to declare. The static web application can be granted the at least one permission based on a prior maliciousness ranking and a threshold value. The static web application can contain all of the resources necessary to execute the application on the client computing device and wherein code needed to execute the application by the client computing device is not dynamically generated. The steps can further include hosting the static web application on the trusted server. The hosting can include providing access to the static web application, and code associated with the static web application, to a web crawler.

For example, the validating of the assurance characteristics of the static web application can include verifying an object of the static web application does not include an object identified as at least one of a malware, a virus, and a Trojan. The validating of the assurance characteristics of the static web application can include verifying a trustworthiness ranking of a developer of the static web application. The updating of the static web application can include replacing objects of the static web application with a revalidated entire application. Prior to requesting at least one permission to utilize local resources of the client device during execution of the static web application by the browser the static web application can execute, on the client device, without permission to utilize local resources of the client device.

Systems and methods described here include an application environment that exhibits one or more advantages of hosted and installed applications.

DETAILED DESCRIPTION OF THE EMBODIMENTS

Figure 1:
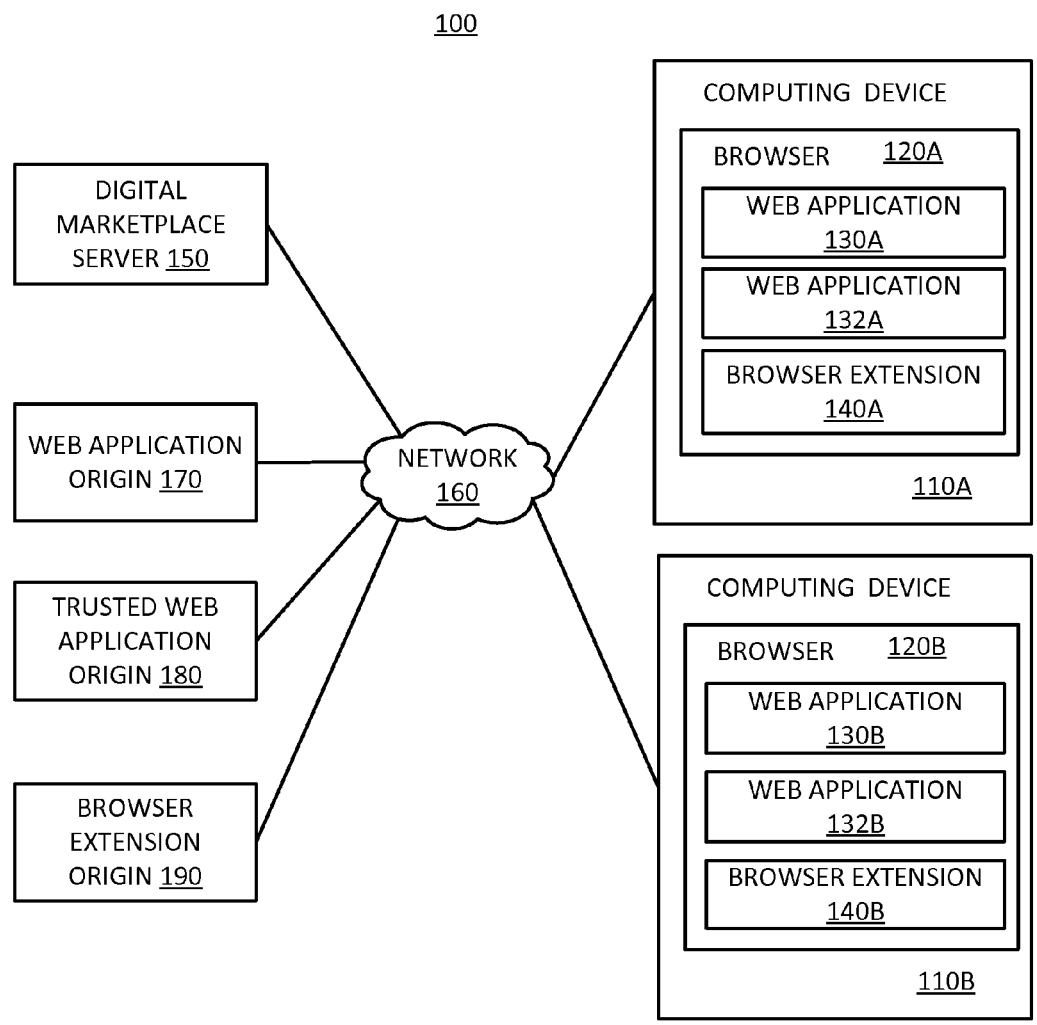
FIGS. 1 and 2 are schematic block diagrams of systems according to at least one example embodiment.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Furthermore, the figures are intended to illustrate the general characteristics of methods and/or structure utilized in certain example embodiments and to supplement the written description provided below. These figures are not, however, to scale and may not precisely reflect the precise structural or assurance characteristics of any given embodiment, and should not be interpreted as defining or limiting the range of values or properties encompassed by example embodiments. For example, the structural elements may be reduced or exaggerated for clarity. The use of similar or identical reference numbers in the various drawings is intended to indicate the presence of a similar or identical element or feature.

A web browser executed by a client device can receive code (e.g., HTML code) from a remote server (e.g., a remote server that hosts a website) and can execute the received code on the client device for the benefit of a user of the client device.

In various implementations, the web browser may include or have installed one or more web applications. In this context, a "web application" may be configured to perform a single task or multiple tasks for a user. In such an implementation, the web application may be configured to be executed or interpreted by the web browser. Thus, web applications can be run inside a web browser with a dedicated user interface, and may provide functionality and an experience that is more rich and interactive than a standalone website but are less cumbersome and monolithic than a desktop application. Examples of web applications include games, photo editors, and video players that are run inside the browser.

Web applications can include "hosted web applications," or "packaged web applications." Hosted web applications can request, and be granted, additional permissions to use local resources of a client computing device, beyond what typical code executed by a browser is permitted to use (e.g., such as, the ability to use more than the normal quota of temporary storage space, use geolocation features without additional confirmation prompts beyond a single install-time one, and the ability to always have a hidden page open which is performing tasks such as synchronizing data for offline use or receiving server-pushed notifications to display to the user). Hosted web applications also get special treatment in a user interface, in that hosted web applications may be shown with a large icon that can be clicked to launch the application either in a tab or in a standalone (possibly full screen) window.

Packaged applications can be thought of as web applications whose code is bundled, so that the user can download all of the content of the web application for execution by the browser or in a standalone window. A packaged web application may not need to have network access to perform its functionality for the user, and rather may be executed successfully by the browser locally on the computing device without access to a network.

Packaged web applications have the option of using extension application programming interfaces (APIs), allowing packaged apps to change the way the browser behaves or looks. In some cases, a packaged web application may operate without appearing to run in a browser, e.g., without the browser "chrome", tabs, or other user interface of the browser. In such a case, the packaged web application would operate in a standalone window without access to content scripts or APIs related to browser state such as cookies, history, bookmarks, open tabs, etc. In various cases, packaged web applications may access USB drives, BLU-ETOOTH devices, open raw network sockets, act as servers, or access the local filesystem, as examples.

In various examples, the web browser may include or be configured to interact with one or more browser extensions. In this context, a "browser extension" may include one or more web pages packaged or grouped together as a definable whole, and configured to extend the functionality to the web browser. As described herein, "browser extensions" are small software programs that can modify and enhance the functionality of a web browser. They may be written using web technologies such as HTML, JAVASCRIPT, and CSS. Extensions may have little or no user interface. In some implementations, extensions may provide a small user interface icon or other user interface that may modify a browser's "chrome", which is defined herein to include an area outside of a webpage displayed in the browser (such as the borders of a web browser window, which include the window frames, menus, toolbars and scroll bars). Selecting the icon or the other user interface may activate the functionality of the extension within the browser.

Thus, browser extensions also provide extra functionality to a browser, but generally, unlike web applications, there is little or no user interface component to the functionality provided by an extension. Instead, browser extensions extend the functionality of the browser and the websites being viewed in it. For example, browser extensions can extend the functionality of the browser by adding a new button to the address bar, such as an ever-present currency converter. Buttons like this can also apply to the current website being viewed, for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page.

Extensions may modify websites, for example to block advertisements, to increase a zoom level on pages, or read strings of text and pass those to a text to speech engine for a blind user. A developer may want injected code from an extension to communicate to the rest of the extension. For example, an extension may remove all images from a news website. The extension may establish a communication channel back to the rest of the extension running in its own process in the browser, using a content script. Because content scripts run in the context of a web page and not the extension, they often need some way of communicating with the rest of the extension. For example, an RSS reader extension might use content scripts to detect the presence of an RSS feed on a page, then notify the background page in order to display a page action icon for that page. Communication between extensions and their content scripts works by using message passing. Either side can listen for messages sent from the other end, and respond on the same channel. A message can contain any valid object (e.g., a JSON object such as null, boolean, number, string, array, or object).

Packaged web applications, in contrast to browser extensions, may look and feel like native applications, with a big-screen design and rich user interface. Both extensions and packaged web applications may bundle all their files into a single file (e.g., .CRX file) that a user downloads and installs. This bundling means that, unlike hosted applications, extensions and packaged web applications do not need to depend on content from the web. Browser extensions and web applications may be distributed via a trusted web store, or via individual websites, as examples.

In some implementations, the API (and/or web API)) may be an element of a web browser as discussed above. However, in some implementations, the API (and/or web API)) may be an element of a web based operating system (Browser-OS). A Browser-OS may be a bootable version of a web browser (including a browser, a media player and a file system). The Browser-OS may store all of a user applications and data on the Web, as opposed to a local hard drive. The Browser-OS (e.g., Chrome-OS®) may replace a traditional operating system.

A web browser and/or a Browser-OS may include an associated runtime. A runtime (also called a runtime system or a runtime environment) can implement some behavior (e.g., low-level (e.g., core) and/or high-level (e.g., type checking, garbage collection and/or debugging)) of a computer language (e.g., HTML and/or JAVASCRIPT) or program (e.g., a web browser). Any computer language can implement some form of runtime, whether the language is a compiled language, interpreted language, embedded domain-specific language, or is invoked via an API. In some implementations, the runtime can retrieve a background page, return details about a manifest, and listen for and respond to events in the app or extension lifecycle. The runtime can convert the relative path of URLs to fully-qualified URLs. In some implementations, the runtime can manage the app lifecycle. The app runtime manages app installation, controls the event page, and can shut down the app at anytime.

With a packaged web application, a user may be comfortable with downloading and installing the application and giving the packaged web application a high level of access to the computing device because the packaged web application has gone through a verification and validation process before the packaged web application listed in a digital marketplace. Therefore, the user trusts that the downloaded code will not be malicious, even though the code has been given a high level of access to the computing device.

By contrast, a hosted web application, even if the application has been approved in the digital marketplace, is essentially nothing more than then a URL to a website plus some metadata that defines some permissions. Because the code at the website pointed to by the URL can change, users should be reluctant to grant a high level of access to the computing device to a hosted web application because the code may become malicious even if the code had been previously approved.

Both packaged web applications and hosted web applications contemplate the user permissions to allow increased use of local resources when running the application. However, users are willing to allow packaged web applications to use more dangerous permissions (e.g., a high level of access to the computing device) because of the code of the packaged web applications is validated and static. In other words, the code of the packaged web application will not change after the code is downloaded and installed on the users machine.

Example embodiments provide systems and methods that create a "hybrid" hosted web application. The "hybrid" hosted web application is a privileged static hosted web application that can exhibit the benefits of both of the above described hosted web applications and packaged web applications as described in more detail below. In other words, the privileged static hosted web application can be a hosted web application including the security properties (e.g., because the privileged static hosted web application has been verified and validated) and offline properties (e.g., will not change) of a packaged web application. The privileged static hosted web application may place constraints on how hosting web applications works. In other words, a privileged static hosted web application is accessed via a trusted hosting provider (e.g., remote server) that is configured to operate in a known (by a client computing device) method, mode, state and/or condition.

For example, in a typical network environment, content is downloaded or utilized without knowledge of how a remote device generated the content. The privileged static hosted web application provides content (e.g., web application objects) that are static and that have been audited in some way to ensure stability, security and/or tested or reviewed to meet some criteria. Throughout this specification privileged static hosted web application, trusted web application and static web application may be used somewhat interchangeably.

FIG. 1 is a block diagram of a computing network 100 in accordance with at least one example embodiment. The network 100 may be used to implement web applications and browser extensions using the techniques described herein. The depiction of network 100 in FIG. 1 is shown by way of example. It will be appreciated that other network configurations may be used for implementing such techniques.

The network 100 includes computing devices 110A and 110B. The computing devices 110A and 110B may take the form of a number of different devices, such as a personal computer, laptop computer, tablet computer, netbook computer, or a web-enabled phone, as examples. The devices 110A and 110B each include a browser 120A and 120B that may be used to access various types of content. Such content may include web sites, photos, video, audio and executable scripts, for example. As shown in FIG. 1, browser 120A includes web application 130A and browser extension 140A, which may be installed on the computing device 110A using the techniques described herein and, once installed, may operate as an integrated part of the browser 120A. The web application 130A may include respective client-side components of the application. Depending on the particular implementation, the web application 130A may include a description of the web application and/or code that is executable by the browser 120A, where that code provides functionality for the web application. Similarly, browser 120B includes web application 130B and browser extension 140B, which may be installed on the computing device 110B using the techniques described herein and, once installed, may operate as an integrated part of the browser 120B.

In the network 100, the computing devices 110A and 110B are coupled with a network 160. The network 160 may include a data access network that provides access to the Internet and/or the World Wide Web. Via the network 160, computing devices 110A and 110B (using browsers 120A and 120B, for example) may communicate with a digital marketplace server 150 (e.g., a web application server or web store), a web application origin 170, a trusted web application origin 180, and a browser extension origin 190. In this example, the web application origin 170 may include server-side components for the web applications 130A and 130B. The browser extension origin 190 may include server-side components for the browser extensions 140A and 140B. The web applications 130A and 130B and browser extensions 140A and 140B may operate using multiple origins. Therefore, the web applications 130A and 130B may have server-side components on multiple web application origins, for example.

In this example, the trusted web application origin 180 may include server-side components for the web applications 132A and 132B. The web applications 132A and 132B may be privileged static hosted web applications. As discussed above, hosted web applications can request, and be granted, additional permissions to use local resources of a client computing device, beyond what typical code executed by a browser is permitted to use. However, the web applications 132A and 132B may be privileged in that the computing devices 110A and 110B may grant extraordinary access to local computing resources. Extraordinary access may be access above that which a hosted web application is granted. For example, the computing devices 110A and 110B may grant access to local computing resources in order for the privileged static hosted web application to access content scripts or APIs related to browser and/or a high level of access to the computing device.

In various implementations, access may be granted to, for example, USB drives, BLUETOOTH devices, open raw network sockets, act as servers, and/or the local filesystem (e.g., not associated with storing pages or browser state such as cookies, history, bookmarks, open tabs). In example implementations, the trusted web application origin 180 may include only the objects associated with a trusted (e.g., privileged static hosted web application) application. Accordingly, the trusted web application origin 180 may include privileged static hosted web applications that have gone through some verification process. Verification processes are described in more detail below. In short, verification processes may be based on assurance characteristics of the web application. The assurance characteristics may be associated with, for example, a developer of the web application, a ranking of the web application based on signals relevant to potential malicious behavior of the web application, and/or scripts executed by the web application.

The web applications 132A and 132B may be static in that any computing device (e.g., via a web browser) accessing one of web applications 132A and 132B will receive a same web application object (e.g., web page). In other words, a static web application is not dynamic with regard to changes to individual objects that make up the web application. In other words, a static web application is changed by replacing (e.g., uploading for use) the entirety of the web application. A developer of a static web application can not replace individual web application objects (e.g., a web page or a user interface or a script) without replacing the web application as a whole. Rather, if a developer wants to make a change to a static web application, the developer must submit the code for the proposed revised web application for revalidation and re-verification before it can be made available at the trusted server. In other words, upon receiving a change (e.g., from the developer of the web application) to an object of the web application 132A and/or 132B, validating of assurance characteristics of the web application 132A and/or 132B, as a whole, is once again performed before the change to the object of the web application 132A and/or 132B is made accessible via the URL.

Accordingly, objects of the web application 132A and/or 132B can not be replaced, redirected, switched, reordered, recoded, and/or the like, and made accessible via the URL without the web application 132A and/or 132B, as a whole, first successfully being validated and/or revalidated. The web applications 132A and 132B may be static in that the web application contains all of the resources necessary to execute the application on the client computing device and the code needed to execute the application by the client computing device is not dynamically generated.

The web applications 132A and 132B may be hosted web applications in that the objects that make up the web application are stored (or substantially stored) on networked or server side computing device (e.g., a server) and served to client computing devices. In other words a client device (e.g., computing devices 110A and/or 110B) request, via a browser and/or a runtime, the objects that make up the web application from the server utilizing a URL as an example. The web applications 132A and 132B may be hosted by a secure server, for example. Such hosting includes providing access to the static web application, and code associated with the static web application, to a web crawler.

In one implementation, the digital marketplace server 150 may be configured to receive requests from user computing devices (such as the computing device 110A) for installation of web applications and browser extensions, and to provide, in response to such requests, installation procedures (or installation packages) for the web applications or browser extensions. Such installation procedures/packages may include, at least, the client-side component for a requested web application.

In the arrangement shown in FIG. 1, browser 120A may be used to request installation of the web applications 130A and browser extension 140A by interacting with the digital marketplace server 150. For example, the digital marketplace 150 may implement a website that is used to distribute web applications, among other content. As an example, the digital marketplace server 150 may implement an e-commerce site. Digital marketplace server 150 may acquire web applications and browser extensions from developers, for example from web application origin 170, trusted web application origin 180, or browser extension origin 190.

Requests to install web applications may be included in messages from the computing device 110 to the digital marketplace server 150 that indicate agreement to purchase respective web applications. In other implementations, the digital marketplace server 150 may take other forms or implement other techniques, such as providing access to free web applications, or may take the form of a developer's website which provides access to web application installation procedures/packages.

In other implementations, installing a web application may include starting a background page for the web application, if the web application includes a background page feature. A background page of a web application may enable the web application to run as soon as the user logs into their computer, including before the user launches a web browser application or launches the associated web application in the web browser application. A background page may an invisible element running in a browser application, where the background page includes a declared association, in the web browser application, with the installed web application.

While network 100 illustrates only a single digital marketplace server 150, web application origin 170, trusted web application origin 180, and browser extension origin 190, it will be appreciated that additional digital marketplaces, servers, origins or trusted origins may be included in network 100.

In some implementations, the web application origin 170, the trusted web application origin 180, and browser extension origin 190 may also implement one or more websites that the computing devices 110A and 110B (e.g., using browsers 120A and 120B) may interact with to request installation of web applications 130A, 130B, 132A and 132B and browser extensions 140A and 140B. As an example, web application 130A may be a packaged application, which includes a manifest file that may include permissions (e.g., permissions to use local resources or do other things normal HTML code is not permitted to do) and at least one HTML file to provide a user interface, along with other files, such as image files. As another example, web application 132A may be a privileged static hosted web applications, which includes a manifest file that may include permissions (e.g., permissions to use local resources or do other things normal HTML code is not permitted to do) and at least one HTML file to provide a user interface, along with other files, such as image files. Browser extension 140A may also include a manifest file and an HTML file, for example.

In some implementations, trusted web application origin 180 may be trusted because it includes a manual review management component, i.e., people review web applications for security issues, bugs, etc. Further, trusted web application origin 180 may be trusted because it may be operated by the same company that develops browsers 120A and 120B, for example, as well as operating systems used to execute web applications and browser extensions. Trusted web application origin 180 may also be trusted because it may operate autonomous procedures by a processor of a computing device to validate web applications for security issues, authorship, bugs, etc. In contrast, other origins (e.g., web application origin 170 and browser extension origin 190) may be less trusted because they are not known to include the same levels of automated and/or manual review or other scrutiny as trusted web application origin 180, and because other origins may not provide trusted browsers or operating systems, for example. The trusted web application origin 180 may be one of a select few web application origins with known addresses identifying the web application origin as trusted.

Browsers 120A and 120B may also provide feedback to trusted web application origin 180 about the local usage of a web application on the client computing device. By receiving such feedback from many client computing devices 110A and 110B, trusted web application origin 180 may gather information about how an application is actually used and about any security issues encountered after the application is accessed from the trusted web application origin 180, for example. Thus, trusted web application origin 180 may analyze web applications based on signals related to security issues, where such signals may include signals based on information about how applications actually perform after the web applications are accessed from the trusted web application origin 180 and executed by a client computing device. For example, users may report malware or bugs to the trusted web application origin 180.

Figure 2:
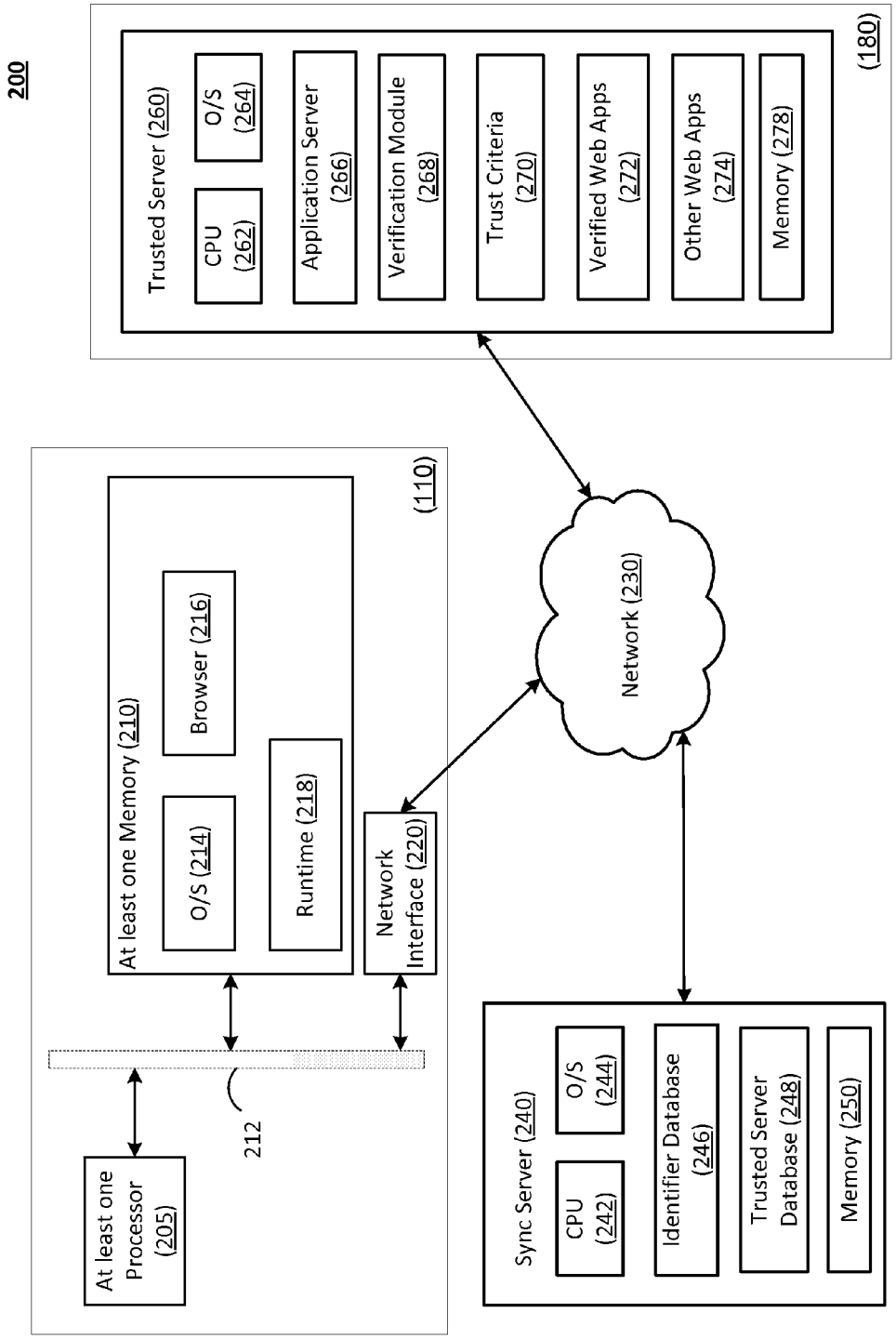

FIG. 2 illustrates a block diagram of a system 200 including a computing device 110 (e.g., computing devices 110A and/or 110B), the trusted web application origin 180, a sync server 240, and a network 230 according to at least one example embodiment. As shown in FIG. 2, the computing device 110 includes at least one processor 205 and at least one memory 210. The at least one processor 205 and the at least one memory 210 are communicatively coupled via bus 212. The computing device 110 may be, for example, an element of any computing device (e.g., personal computer, a laptop computer and the like).

As shown in FIG. 2, the at least one memory 210 includes code that can be executed to provide an operating system (O/S) 214, a browser 216, and a runtime 218. The operating system (O/S) 214, the browser 216, and the runtime 218 (together) may be configured to implement (at least a portion of) the methods described herein.

According to example implementations, the operating system 214 manages hardware resources associated with computing device 110 and provides common services for computer programs executing on computing device 110. According to example implementations, the browser 216 implements the functions of a browser (e.g., web browser) described in more detail above.

According to example implementations, the runtime 218 can implement some behavior (e.g., low-level (e.g., core) and/or high-level (e.g., type checking, garbage collection and/or debugging)) of a computer language (e.g., HTML and/or JAVASCRIPT) or program (e.g., a web browser). Any computer language can implement some form of runtime, whether the language is a compiled language, interpreted language, embedded domain-specific language, or is invoked via an API. In some implementations, the runtime 218 can retrieve a background page, return details about a manifest, and listen for and respond to events in the app or extension lifecycle. The runtime 218 can convert the relative path of URLs to fully-qualified or absolute URLs. In some implementations, the runtime 218 can manage an application lifecycle. In this case, runtime 218 manages application installation, controls the event page, and can shut down the application at anytime.

As shown in FIG. 2 the system 200 can also include a sync server 240 that includes one or more processors 242, one or more memories 250, an operating system (O/S) 244, an identifier database 246, and a trusted server database 248. The identifier database 246 can store unique identifiers to enable syncing between various user sessions on different client computing devices e.g., computing devices 110, 110A and/or 110B.

For example, in some implementations, a user account allows a user to authenticate to system services (e.g., web applications) and receive authorization to access them. To log into a user account, a user may authenticate herself with a password or other credentials for the purposes of accounting, security, and resource management, for example. Once the user has logged on (e.g., to a web browser, to a computing device, etc.), an operating system may use an identifier such as an integer to refer to the user, rather than a username. For example, the username may be correlated with a user identifier. A system (e.g., sync server 240) may reconcile and validate the proper ownership of user accounts, and can permanently link ownership of those user accounts to particular individuals by assigning a unique identifier to validated account login identifiers (e.g., user names and passwords, secure identifiers, etc.). The system may validate that individuals only have account login identifiers for the appropriate systems and applications, for example according to an organization's business policies, access control policies, and various application requirements.

In some implementations, for example, when a user signs into a web browser or a certain device, all of the user's bookmarks, extensions, web applications, theme, other browser preferences and/or settings may be loaded from a sync server 240 via a network 230 and a network interface 220. Accordingly, the user's bookmarks, extensions, web applications, theme, other browser preferences and/or settings may be saved (e.g., in memory 250) and synced to a user's account (e.g., using identifier database 246). The user can then load these settings anytime the user signs into the web browser on other computers and devices. Changes to browser settings, for example, may be synced instantaneously to the account, and may be automatically reflected on other computers where the user has signed in (and enabled syncing).

Changes to settings on one computing device may be automatically copied (e.g., via sync server 240) from other computers (for example, if the user has enabled that sync feature). Synced data may be encrypted when it travels between computing devices to keep information secure. Further, passwords may be encrypted on computing devices using a cryptographic key. The sync server 240 may include a central service configured to hash settings that detects if suddenly a large number of devices request hashes for specific new settings and in this case refuse to provide hashes. The sync server 240 may include user submitted information about inconsistencies that are then used to build or improve a model to calculate confidence. The sync server 240 may report detections of inconsistencies to estimate the magnitude of infection rates.

Accordingly, information associated with browser settings (as well as the settings themselves) may be read from a file (e.g., XML file) or data store (e.g., database) downloaded (e.g., synchronized) from the sync server 240 and stored in memory 210. The identifier database 246 and/or the trusted server database 248 may access the file and/or data store in order to supplement and or generate the information about settings.

In some implementations, the trusted server database 248 may include a listing of trusted web application origin(s) 180 and/or a listing of trusted server(s) 260 and/or some other networked device(s) configured to provide access to privileged static hosted web applications. For example, the trusted server database 248 may include whitelists and/or blacklists indicating trusted web application origin(s) (e.g., corresponding addresses of trusted/untrusted web application origin(s)). For example, a whitelist may include a list of permissible trusted web application origin(s). As another example, a blacklist may include a list of non-permissible trusted web application origin(s). In other words, a server may be configured as a trusted web application origin, but be listed on a blacklist based on some criteria (e.g., user exclusion and/or past issues). Various combinations of whitelists and blacklists may be used. In one example, a whitelist in a corporate environment may allow employees to utilize productivity applications as privileged static hosted web applications, and a blacklist may prevent specific games or social applications from being used as privileged static hosted web applications. In another example, a parent may create a blacklist to deny children from utilizing certain categories (e.g., payment based games) of privileged static hosted web applications.

As shown in FIG. 2 the system 200 can also include a trusted server 260 that includes one or more processors 262, one or more memories 278, an operating system (O/S) 264, an application server 266, a verification module 268, trusted criteria 270, a verified web applications datastore 272, and an other web applications datastore 272.

The verification module 268 may be configured to utilize the trusted criteria 270 in order to validate assurance characteristics of the web application. In other words, the verification module 268 may verify that a web application can be a trusted web application based on assurance characteristics of the web application. For example, the verification module 268 may be configured to gather, and store associated information in the trusted criteria 270, a great deal of information about how an application is actually used and about any security issues a user encounters after the application is accessed from the verification module 268, for example. Thus, the verification module 268 may analyze web applications based on signals related to security issues, where such signals may include signals based on information about how applications actually perform after the web applications are accessed from the verification module 268 and executed by a client computing device. For example, users may report malware or bugs to the verification module 268.

Further, the verification module 268 may be configured to utilize information stored in the trusted criteria 270 to determine if a web application is a static web application. As discussed above, any computing device (e.g., via a web browser) accessing a static web application will receive a same web application object (e.g., web page). In other words, a static web application is not dynamic with regard to changes to individual objects that make up the web application. In other words, a static web application is changed by replacing (e.g., uploading for use) the entirety of the web application. A developer of a static webpage can not replace individual web application objects (e.g., a web page or a user interface or a script) without replacing the web application as a whole. Still further, the verification module 268 may be configured to utilize information stored in the trusted criteria 270 to revoke (or remove) a web application from a trusted status should any information associated with the application change placing the trustworthiness of the application in doubt. The verification module 268 may be configured to track access into and out of the web application.

Upon determining (e.g., verifying) a web application is trusted and static, the web application is associated with (or stored in) verified web applications datastore 272. In other words, upon verification, the web application becomes a privileged static hosted web application. For example, web application objects, metadata, URLs, and the like are associated with the verified web applications datastore 272. The verified, trusted web applications, as a privileged static hosted web application, may have an associated URL (relative or absolute). Accordingly, unlike a packaged application, objects associated with the web application may be indexed (e.g., using a web crawler). Therefore, the web application, as privileged static hosted web application, (and its associated objects) may be searchable using a search engine. Further, objects or content associated with a privileged static hosted web application may be navigated to via a browser or shared (linked to) other applications.

Other web applications datastore 274 may include web applications not intended as privileged static hosted web application (e.g., the other web applications may not be static) that may be associated with the trusted server 260. However, in some implementations, the other web applications datastore 274 may include web applications waiting to for, or in the process of, verification. For example, a developer may load a web application version 2.0 in association with the other web applications datastore 274 and "tag" the web application 2.0 as a replacement/upgrade for a web application 1.0. The web application 2.0 is verified (e.g., checked as static, checked as secure, and the like) and once verified web application 2.0 is associated with verified web applications datastore 272. In order to maintain some history, web application 2.0 may be associated with other web applications datastore 274. An out of date or historical web application associated with the other web applications datastore 274 may have any associated URLs disabled so that access is disabled.

In the example of FIG. 2, the computing device 110, trusted server 260 and/or sync server 240 may be at least one computing device and should be understood to represent virtually any computing device configured to perform the methods described herein. As such, the computing device 110, trusted server 260 and/or sync server 240 may be understood to include various standard components which may be utilized to implement the techniques described herein, or different or future versions thereof. By way of example, the computing device 110, trusted server 260 and/or sync server 240 are illustrated as including the at least one processor 205, 242 and 262, respectively, as well as the at least one memory 210, 250 and 278 (e.g., a non-transitory computer readable storage medium) respectively.

Thus, as may be appreciated, the at least one processor 205, 242 and/or 262 may be formed on a substrate and may be utilized to execute instructions stored on the at least one memory 210, 250 and/or 278, so as to thereby implement the various features and functions described herein, or additional or alternative features and functions. Of course, the at least one processor 205, 242 and/or 262 and the at least one memory 210, 250 and/or 278 may be utilized for various other purposes. In particular, it may be appreciated that the at least one memory 210, 250 and/or 278 may be understood to represent an example of various types of memory and related hardware and software which might be used to implement any one of the modules described herein. Systems and/or methods described above and/or below may include data and/or storage elements. The data and/or storage elements (e.g., data base tables) may be stored in, for example, the at least one memory 210, 250 and/or 278.

FIGS. 3-6 are flowcharts of methods according to example embodiments. The steps described with regard to FIGS. 3-6 may be performed due to the execution of software code stored in a memory (e.g., at least one memory 210, 250 and/or 278) associated with an apparatus (e.g., as shown in FIGS. 1 and 2) and executed by at least one processor (e.g., at least one processor 205, 262 and/or 242) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 3-6.

Figure 3:
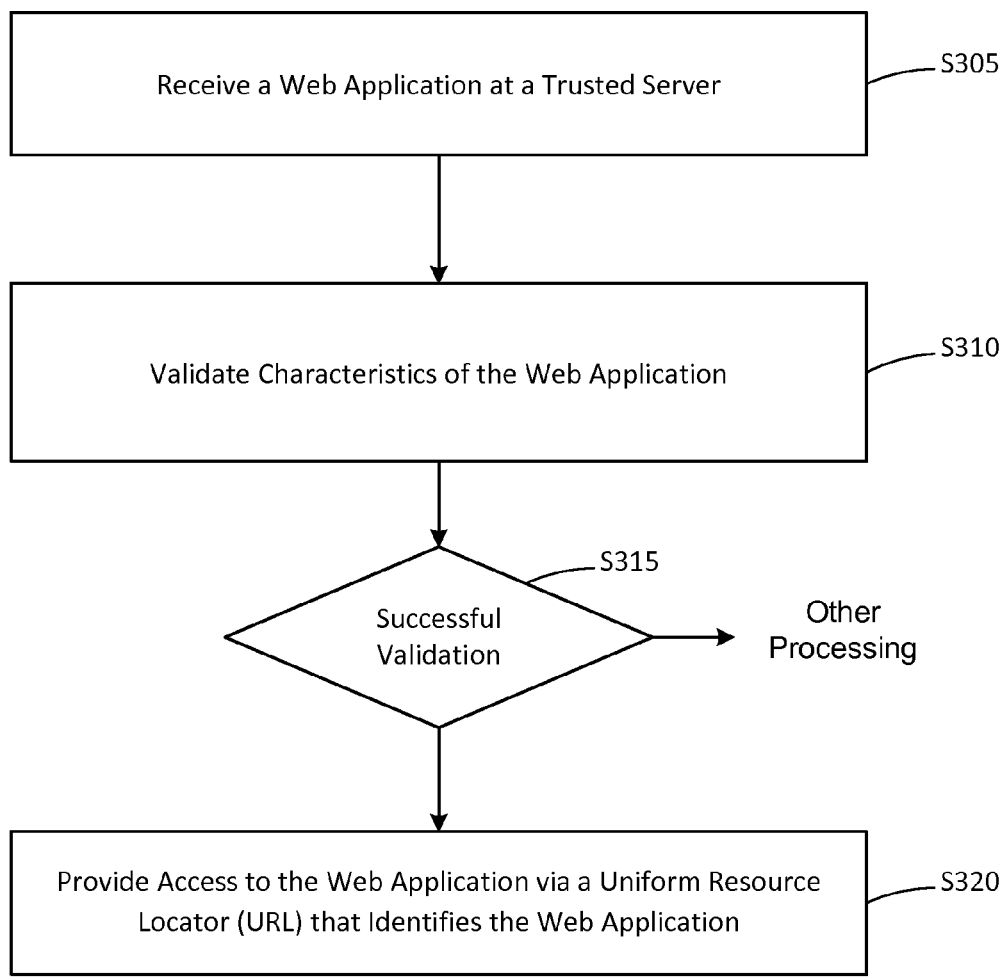
FIGS. 3 and 4 are flowcharts of method of distributing privileged static hosted web applications according to at least one example embodiment.

FIG. 3 is a flowchart of a method according to at least one example embodiment. As shown in FIG. 3, in step S305 a web application is received at a trusted server. For example, a web application developer may develop an application that is a candidate to become a privileged static hosted web application. The web application (including all, or substantially all, application objects) may be communicated from the developers computing device (not shown) to a trusted server (e.g., trusted server 260). The trusted server may store the received web application. For example, trusted server 260 may store the web application in the other web applications datastore 274 and/or in memory 278.

In step S310 assurance characteristics of the web application are validated. For example, the verification module 268 may validate assurance characteristics associated with the web application. The assurance characteristics that may be validated and the mechanism by which the assurance characteristics may be validated may be stored in the trust criteria 270. The assurance characteristics may be associated with the objects associated with the web application. For example, a web application that includes an object identified as malware, a virus, a Trojan or some other form of malicious software may be deemed untrustworthy. For example a web application that includes links to objects or objects that are external (e.g., not associated with or stored on the trusted server) may be considered untrustworthy or not static because the objects could be changed outside of the trusted environment. In some implementations, assurance characteristics may be associated with the developer. For example, a developer that has many reports of problematic web applications may be considered untrustworthy or may have a ranking associated with a lower trustworthiness score than other developers. Accordingly, web applications associated with an untrustworthy developer may be considered untrustworthy.

If in step S315 the validation is successful, the web application is indicated as a privileged static hosted web application and processing continues to step S320. Otherwise, some other processing is performed. In step S320 access to the web application is provided via a uniform resource locator (URL) that identifies a location of the web application in a public Internet. For example, the objects associated with the now privileged static hosted web application may be associated with (or stored in) the verified web applications datastore 272 which then may be accessed via the public Internet (e.g., universally available to a user from anywhere within the Internet). Each of the objects within the web application (e.g., the privileged static hosted web application) may be relative to an initial or start-up object. Accordingly, the URL associated with the initial or start-up object may be published as the access mechanism to the web application. Alternatively, each of the objects within the web application (e.g., the privileged static hosted web application) may have an absolute URL and each of the absolute URLs may be published.

Figure 4:
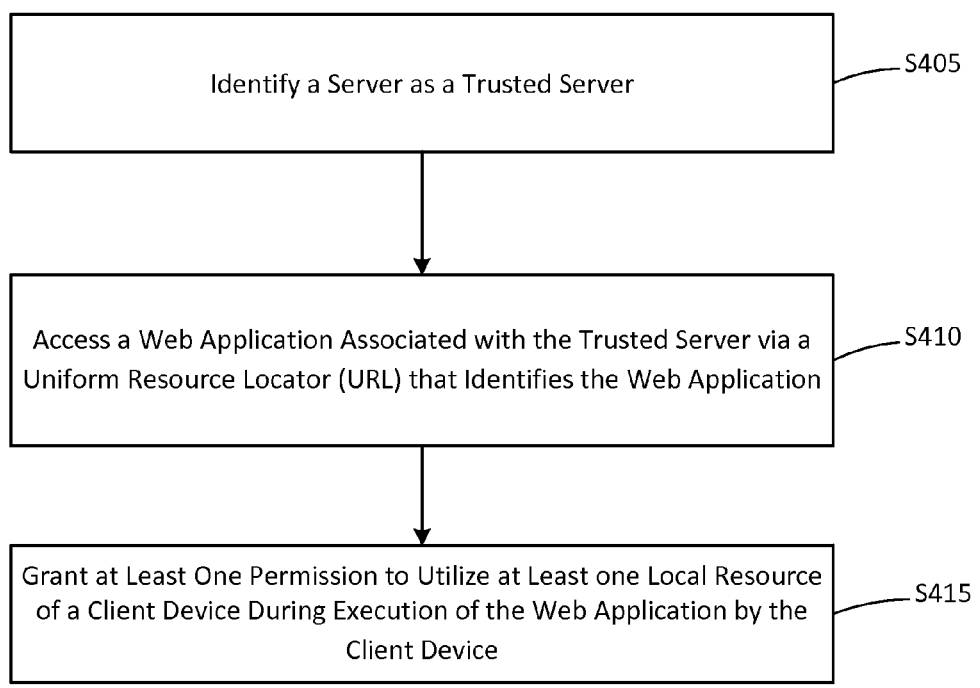

FIG. 4 is a flowchart of another method according to at least one example embodiment. As shown in FIG. 4, in step S405 a server is identified as a trusted server. For example, a client computing device (e.g., computing device 110) may be communicatively coupled to a server (e.g., trusted server 260). The server may have a unique identification. The client computing device may have access to a list of trusted servers. For example, the list of trusted servers may be stored locally and/or be accessed through a networked server (e.g., sync server 240). In this implementation, the unique identification of the server is used to search the list of trusted servers to determine if the server is a trusted server. In other words, if the server is included in the list of trusted servers, the server is identified as a trusted server.

Alternatively, or in addition to, the server may communicate some set of information that the client device can use to determine the trustworthiness of the server. Alternatively, or in addition to, a user of the client device may select the server as a trusted server based on, for example, ownership of the server.

In step S410 a web application associated with the trusted server is accessed via a uniform resource locator (URL) that identifies the web application. For example, as discussed above, a privileged static hosted web application may have an associated URL. The URL may be associated with an initial or start-up object for the web application with a relative URL for other objects of the web application and/or each object of the web application may have an associated absolute URL. In some implementations, because each object has either an associated relative URL or absolute URL, the objects may be linked to, called and/or accessed using any internet protocol.

As discussed above, the privileged static hosted web application may have properties similar to those of a packaged web application. One of those properties is the ability to operate offline. Therefore, accessing the web application may include downloading (e.g., via HTML) all of the objects associated with the web application. As discussed above, the web application being a privileged static hosted web application is static. Therefore, downloading the objects as static objects ensures consistency with regard to functionality of the web application which is a property of packaged web applications.

In one example implementation, a runtime (e.g., runtime 218 shown in FIG. 2) associated with the client (e.g., computing device 110) interacts with a host server (e.g., trusted server 260) such that the host server includes the objects associated with the web application and the runtime executes the web application. Accordingly, the runtime communicates with the host server and collaborates with the host server in the execution of the web application (e.g., privileged static hosted web application). In contrast to a packaged application, there is no prior download of all of the objects associated with the web application. In other words, the privileged static hosted web application is executed by the runtime without a prior download of the web application objects.

In step S415 at least one permission to utilize at least one local resource of a client device is granted during execution of the web application by the client device. For example, the web application (e.g., a privileged static hosted web application) may be granted permission to access application programming interfaces (APIs), allowing the web application to change the way a browser behaves or looks. In some cases, the web application may operate without appearing to run in a browser, e.g., without the browser "chrome", tabs, or other user interface of the browser. In such a case, the web application would operate in a standalone window without access to content scripts or APIs related to browser state such as cookies, history, bookmarks, open tabs, etc. However, in this case the web application may be granted access to operating system (e.g., Browser-OS or operating system 214) resources (e.g., API's). In various cases, the web application may be granted access to USB drives, BLUETOOTH devices, open raw network sockets, act as servers, or access to the local filesystem, as examples.

Figure 5:
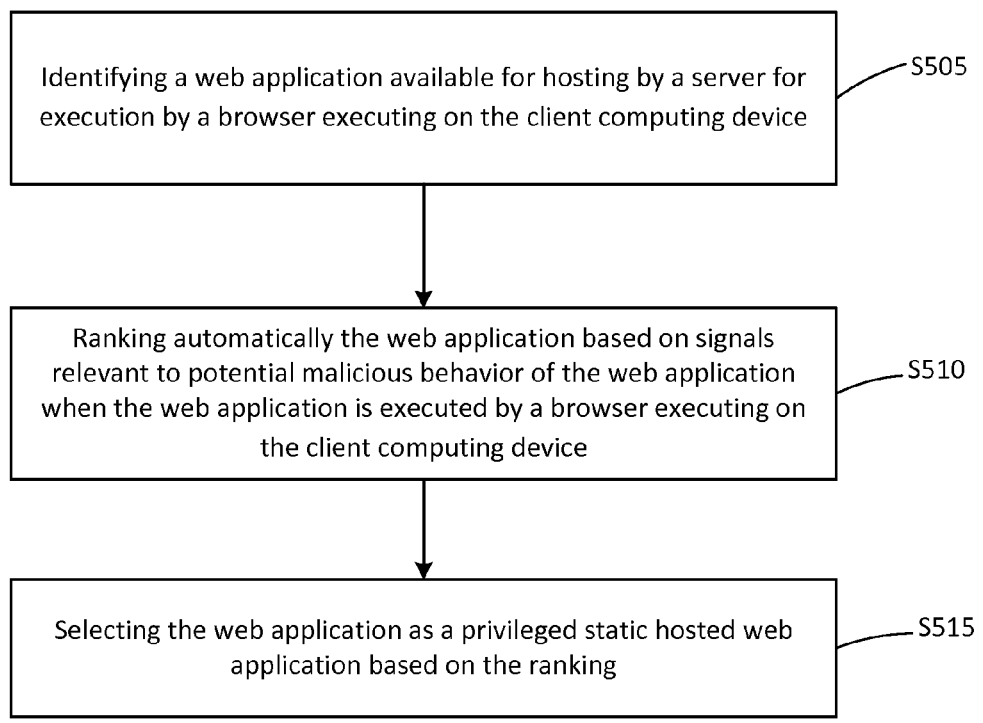
FIGS. 5 and 6 are flowcharts of method of verifying web applications according to at least one example embodiment.

FIG. 5 is a flowchart of another method according to at least one example embodiment. As shown in FIG. 5, in step S505 the method includes identifying, by at least one processor (e.g., a silicon-based hardware processor) of a computing system, a web application available for hosting by a server for execution by a browser executing on the client computing device. In step S510 the web application is ranked automatically based on signals relevant to potential malicious behavior of the web applications when the web application is executed by a browser executing on the client computing device. In step S515 the web application is selected as a privileged static hosted web application based on the ranking.

For example, in some implementations the verification module 268 may be configured to select a web application based on the permissions used by a particular web application. For example, a score can be assigned to each permission that might be used by a web application, where the scores are indicative of a risk level of a web application that uses the permission. For example, a score assigned to a cross-origin XML HttpRequest permission might be very high, because of the potential for malicious consequences when this permission is utilized. Similarly, a score for a permission for the web application to run native code on the client device or for a permission for the web app to access or store a user's password information might be very high. In contrast, a score assigned to a permission to determine a time when the web application is idle might be very low. In another example, a score assigned to a permission to access all of the user's data on all websites visited by the user may be higher than a score assigned to a permission to access a user's data on a particular single website or on a small number of websites.

In some implementations, the scores can be quantitative scores that range from a minimum value to a maximum value and that can take on discrete intermediate values between the minimum and a maximum value. The values of a score can have one or more significant digits. For example, scores can range from 1 to 10 in steps of 1, 0.1, 0.01, etc. In some implementations, the scores assigned to a permission can be determined by one or more experts who assign scores based on their anticipated use in a web application. In some implementations, a score for a permission can be determined based on performance metrics associated with a web application that use a particular permission. For example, a score for a permission can be determined based on a frequency with which a web application uses the permission crashes when executed on a client computing device.

The permissions that are declared by a web application can be determined automatically (i.e., without human interaction). In one implementation, the application verification module 268 can automatically parse the manifest file of the proposed application to determine the permissions that would be sought from a user who would access the proposed application. Once the permissions declared by a web application are determined, they can be analyzed by the verification module to determine a score and a rank of the web application based, at least in part, on the permissions declared by the web application.

In some implementations, a score for the potential malicious behavior of a web application can be based on an aggregation of the individual scores of permissions used by the web application. For example, in one implementation, as shown in Table 1 below, web application A, B, C, D, E, F, G, identified by their ID in the table, can declare the use of one or more of permissions P1, P2, P3, P4, P5, P6, each of which has been assigned an individual score. For web applications that use a particular permission, the score of the permission is shown in the corresponding cell of the Table 1. Then, a score for a web application can be the sum of the individual scores for permissions declared by the web application, as shown in the most right-hand column of Table 1, which ranks the web applications by their total score. In other implementations, a score for a web application can be a weighted sum of the individual scores for permissions declared by the web application. In still other implementations, a score for a web application can be equal to the maximum score of a permission declared by the web application for example, as shown in Table 2 below, which provides another ranking of web application.

TABLE 1

| ID | P1 | P2 | P3 | P4 | P5 | P6 | Score |
|----|----|----|----|----|----|----|-------|
| G | 9.3 | 2.0 | 0.0 | 6.7 | 2.8 | 7.5 | 28.3 |
| A | 9.3 | 2.0 | 8.7 | 0.0 | 0.0 | 7.5 | 27.5 |
| C | 0.0 | 0.0 | 8.7 | 6.7 | 0.0 | 0.0 | 15.4 |
| E | 0.0 | 2.0 | 0.0 | 0.0 | 2.8 | 7.5 | 12.3 |
| D | 9.3 | 0.0 | 0.0 | 0.0 | 2.8 | 0.0 | 12.1 |
| F | 0.0 | 2.0 | 0.0 | 6.7 | 0.0 | 0.0 | 8.7 |
| B | 0.0 | 2.0 | 0.0 | 0.0 | 0.0 | 0.0 | 2.0 |

TABLE 2

| ID | P1 | P2 | P3 | P4 | P5 | P6 | Score |
|----|----|----|----|----|----|----|-------|
| G | 9.3 | 2.0 | 0.0 | 6.7 | 2.8 | 7.5 | 9.3 |
| A | 9.3 | 2.0 | 8.7 | 0.0 | 0.0 | 7.5 | 9.3 |
| D | 9.3 | 0.0 | 0.0 | 0.0 | 2.8 | 0.0 | 9.3 |
| C | 0.0 | 0.0 | 8.7 | 6.7 | 0.0 | 0.0 | 8.7 |
| E | 0.0 | 2.0 | 0.0 | 0.0 | 2.8 | 7.5 | 7.5 |
| F | 0.0 | 2.0 | 0.0 | 6.7 | 0.0 | 0.0 | 6.7 |
| B | 0.0 | 2.0 | 0.0 | 0.0 | 0.0 | 0.0 | 2.0 |

In some implementations, the way a score for a web application is determined based on permissions can depend on what the web application is. For example, an algorithm used to determine a score for a game web application based on the permissions declared by the game application can be different than algorithm used to determine a score for a productivity web application based on the permissions declared by the productivity application.

The scores assigned to a web application can also be determined based on the methods or functions called by a permission that is declared by the web application. In general, a score for a web application that declares a particular potentially dangerous permission but does not make calls to dangerous methods with that permission will have a lower score than a web application that uses the same permission that makes calls to dangerous methods in that permission. For example, a web application that declares the cross-origin XML HttpRequest permission and uses the permission to request access to domains known to be safe (e.g., "http://www.google.com/" or http://www.gmail.com/) may have a lower score than a web application that declares the cross-origin XML HttpRequest permission and uses the permission to request access to all domains (e.g., http://*/) or that uses the permission to request access that is known to be less than safe or that is not known explicitly to be safe.

In some implementations, the influence of a method call can affect the score assigned to a permission declared by a web application by increasing/decreasing the score that a particular permission would receive otherwise. In other implementations, method calls may receive their own scores that are considered along with scores for permissions in an algorithm to determine a score for a web application, such as, for example, as explained above.

In addition to checking the permissions of a proposed web application, the verification module 268 can check if the code of the proposed web application matches one or more known malicious code sequences (i.e., malware) that may result in harm to the user to the client computing device. For example, the trust criteria 270 can store a plurality of known fingerprints of malicious code sequences, and the verification module 268 can parse the code of the proposed web application and then compare the parsed code to the fingerprints of stored malicious code. Then, if the code of the proposed application matches one or more known potentially malicious code sequences, the proposed application can receive a higher score than the proposed application would receive based on its declared permissions alone.

The verification module 268 also can check if the code of the proposed web application matches one or more potentially malicious code sequences that may leave the client device vulnerable to security attacks (e.g., cross-site scripting (XSS) attacks that enable attackers to inject client-side script into web pages executed by the client computing device) or that indicate that the code of the web application has changed significantly and therefore may have changed its purpose. As with scanning for malware, the trust criteria 270 can store a plurality of known fingerprints of suspicious code sequences, and the verification module 268 can parse the code of the proposed web application and then compare the parsed code to the fingerprints of code stored in the application analysis database. Then, if the code of the proposed application matches one or more suspicious code sequences the proposed application can receive a higher score than the proposed application would receive based on its declared permissions alone.

In addition to the signals described above used to determine a ranking of web application based on signals relevant to potential malicious behavior of the web application, web applications also can be ranked based on reputation-based measures. For example, a score determined for a web application based on the permissions declared by the web application can be supplemented (e.g., increased or decreased) based on various information that can be used to infer a reputation of the web application. For example, if two web application declare the same permissions, then the web application that is uploaded by a developer who, in the past, has provided other web applications that have had a low probability of including malicious behavior may receive a decrease in its score, while the web application that is uploaded by a developer who does not have a substantial record of having provided other web applications that have a low probability of including malicious behavior may receive an increase in its score. In other implementations, a first web application that contacts a website that has been determined to include code that causes malicious, unsecured, or risky behavior when executed may receive a higher score than a second web application that does not contact the website, even if the first and second web applications declare the same permissions and make the same method calls.

Finally, a web application may be selected as privileged static hosted web application if a score and/or rank is between a first threshold value and a second threshold value. For example, if a web application has a corresponding score and/or rank that is below a first threshold value, the risk may be so low (e.g., no permissions requested and/or no detected malware) that there is no need or desire to host the web application on a trusted server. However, if a web application has a corresponding score and/or rank that is above a second threshold value, the risk may be so high that the web application is considered to risky and/or untrustworthy. In between the first threshold value and the second threshold value may be web applications that are candidates for selection as a privileged static hosted web application. Alternatively, a web application that has a corresponding score and/or rank that is above or below a may be selected as a privileged static hosted web application.

Figure 6:
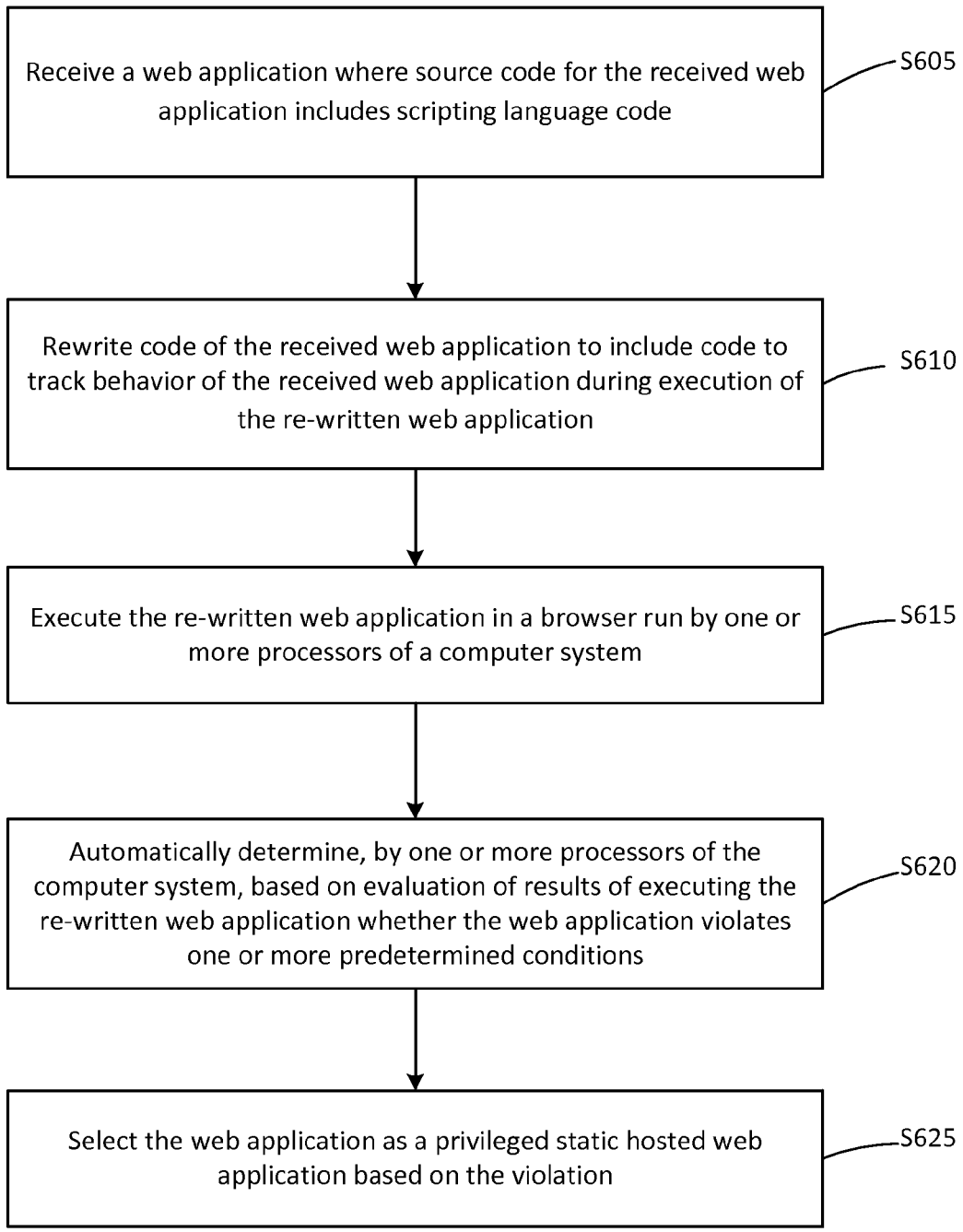

FIG. 6 is a flowchart of another method according to at least one example embodiment. As shown in FIG. 6, in step S605 a web application is received, by at least one processor, where source code for the received web application includes scripting language code. In step S610 code of the received web application is rewritten to include code to track behavior of the received web application during execution of the re-written web application. In step S615 the re-written web application is executed in a browser run by one or more processors of a computer system. In step S620 determine, by one or more processors of the computer system, based on evaluation of results of executing the re-written web application whether the web application violates one or more predetermined conditions. In step S625 the web application is selected as a privileged static hosted web application based on the violation.

For example, in some implementations the trusted server 260 may be configured to receive a request and a copy of the proposed web application, the trusted server 260 can initiate an automatic vetting process of the proposed web application. The automatic vetting process can be performed by the verification module 268 within the trusted server 260 before it is offered for sale as a hosted web application. The proposed web application can be stored in the other web apps datastore 274 of the trusted server 260 before it is vetted and approved.

Verification module 268 can include one or more memories configured for storing executable code as well as one or more associated processors. In one implementation, the verification module 268 can automatically dynamically test a web application that is proposed for use a privileged static hosted web application, for example, for inclusion in the verified web applications datastore 272, to determine whether the proposed web application violates one or more predetermined conditions that would trigger either exclusion of the proposed web application or a mandatory manual review of the proposed web application should be performed. When the proposed web application is received in a package format, a file extractor (e.g., as a sub element of the verification module 268) can extract files from the package. The file extractor can extract the manifest file, which can include information such as the title, version and build data of the web application, and the location path to source code files that are included in the package. To extract source code files of the web application, the file extractor can access the manifest file to retrieves a listing of files that include source code. In another implementation, the file extractor can scan file extensions of the files included in the web application package and identify files with extensions specific to source code files.

Source code of the received web application can be rewritten to include code to track behavior of the web application during execution of the rewritten web application. The rewritten code of the web application can be executed by the trusted server 260. In some implementations, the rewritten code of the web application can be executed by a browser that runs within a virtual machine of the trusted server 260. While the rewritten web application executes within the browser, it can connect to a network, such as the Internet, through a proxy. While the rewritten web application executes, its dynamic behavior can be logged and analyzed.

Based on evaluation of results of executing the rewritten web application, an automatic determination (i.e., without human input or intervention) can be made about whether the proposed web application would violate one or more predetermined conditions that are relevant to whether the proposed web application should be selected as a privileged static hosted web application. Then, based on evaluation of results of whether the web application violates a predetermined condition, an automatic determination (e.g., without human input or intervention) can be made whether the proposed web application can be a privileged static hosted web application, or whether to deny the proposed web application as a privileged static hosted web application, or whether to flag the proposed web application for further manual review.

Web applications that utilize scripting language source code (e.g., JavaScript) can receive a variety of inputs that can be used as values for variables in the source code. For example, JavaScript event handlers may execute as a result of user actions such as clicking buttons or submitting forms that are presented to the user when the code is executed. In addition, JavaScript can accept user input, such as, for example, text input by a user as values for variables in the code. JavaScript can also accept uniform resource locators (URLs) as values for variables in the code, and information hosted on other tabs or frames, different from the tab or frame in which the JavaScript code of the web application executes, can communicate with JavaScript code of the web application through inter-frame communication abstractions such as URL fragment identifiers and the PostMessage operation of HTML 5. All of these various inputs to the scripting language code can influence the dynamic behavior of the web application, sometimes in ways that are difficult to foresee. Therefore, the trusted server 260 can be used to evaluate automatically all, or at least a large number of the control paths of the proposed web application and determine the inputs that influence the control path taken by the web applications during execution of its code.

To do this, the verification module 268 can rewrite source code of the proposed web application to replace certain inputs with symbolic variables, so that symbolic information is propagated during execution of the rewritten web applications. Then, whenever an operand of a JavaScript operation is symbolic, the operation can be simulated by creating a formula for the result of the operation in terms of symbolic information used for the operands. When symbolic value is propagated to a node of the control path for the code of the web application from which multiple branches occur, the verification module 268 can determine the inputs that would cause the code execution to propagate down each branch.

Nodes in the control path can be associated with control words in the source code. For example, control words in a JavaScript code many include "if", "else", "for", "ease", "switch", "default", "break", etc. Control words are specific to a particular programming language used to for the source code of a web application. Thus, while the rewritten source code is executed, the verification module 268 can monitor the propagation of symbolic information to determine which symbols, corresponding to variables in the code of the proposed web application, influence the control paths taken by the executed code. This symbolic execution of the rewritten code can be used to fully execute all possible control code paths in the source code of the proposed web application.

For example, in the source code statement:

if var $v=(x>1) f(a);f(b)$, the word "if" can be identified as a control word, and the verification module 268 can determine that when the first expression (x>1) is true, variable "v" is set to the second expression (v=f(a)), but if the first expression is false, "v" is set to the third expression (v=f(b)). Thus, for each control statement, or node in the control path, the verification module 268 analyzes the dynamic behavior of the web application. The source code statement the above can be presented graphically as in the diagram below, where the "x>1" block represents a node of the control graph and the "v=f(a)" and "v=f(b)" blocks represent two branches of the graph.

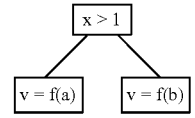

By rewriting the proposed web application such that symbolic information is propagated during execution of the rewritten web application, a standard JavaScript interpreter can be used to interpret the rewritten web application. In other words, a JavaScript interpreter that is used to interpret the proposed web application can also be used to interpret the code of the rewritten web application and a special interpreter need not be used.

The symbolic execution techniques described above can be used to automatically determine control paths in the code of a proposed web application. Then, certain of the determined control paths can be executed by, for example a virtual machine that mimics a client computing device, and the results of that execution can be used to determine whether the proposed web application violates one or more predetermined conditions that would prevent the proposed web application from being a privileged static hosted web application or that would require the proposed web application to be manually vetted before it could be a privileged static hosted web application. In some implementations, control paths that include operations may be flagged as potentially suspicious, either because of what the operation does or because of the inputs that the operation uses to perform its function.

Such control paths that include potentially suspicious operations can be executed (e.g., by the virtual machine) to observe the dynamic behaviour of the proposed web application. While the web application executes, the verification module 268 can monitor the dynamic behaviour of the proposed web application, including the behaviour of the potentially suspicious operations. Monitoring the dynamic behaviour of the proposed web application can include logging network requests made by the web application, logging writes made to local storage, recording dialog boxes that appear as a result of the execution of the code, etc.

Because the symbolic execution techniques can be used to determine the inputs that determine which particular control paths are taken during execution of the web application, the inputs that cause anomalous or undesirable behaviors in the execution of the proposed web application can be quickly and automatically identified. For example, the verification module 268 may list a web application having a code block that executes only when a URL input is equal to a particular value as a predetermined condition to look for during dynamic execution of the rewritten web application. Such a web application may operate benignly in nearly all cases, except when a URL input is equal to a particular value (e.g., "www.facebook.com"), and then in the anomalous case the web application may perform undesirable actions (e.g., sending spam, sending unwanted ads, or automatically downloading a new web application). In another example, the verification module 268 may list a web application having a code block that prompts a user to download and install a Windows binary file as a predetermined condition to look for during dynamic execution of the rewritten web application.

Rewriting of a proposed web application also can be used to automatically detect leaks of sensitive information from a web application executing on a computing device across a network to a third-party site. Rewriting of a proposed web application in this manner can be known as "taint tracking" in which the flow of information within, and out of, a web application can be monitored automatically. For example, a "taint" property can be added to tainted variables (e.g., variables that received and/or store personal and sensitive information of a user) that are identified in the code of the proposed web applications. An example tainted variable is a variable that receives the results of a function such as "GetBrowserBookmarks( )" or "GetBrowserCookies( )." Other examples of tainted variables include those variables that receive or store personal or sensitive information of the user such as, for example, information about a user's browsing history a user's browser bookmarks, a user's cookies, HTML forms, user preferences, saved passwords, a user's keyboard or mouse movements, HTML data, URLs associated with a user, etc. Tainted variables may be copied, replicated, or sent to another variable. For example, in the source code below

```
var x = "GetBrowserBookmarks( )";
// some source code
    var a = GetData( );
Var y = x + a;
``` variable "x" is a tainted variable because it receives a listing of the user's bookmarks and the browser that executes the code. Variable "y" is also a tainted variable because it is set, at least in part, to the data in variable "x."

When the scripting language of the proposed web application is JavaScript, primitive datatypes can be rewritten as objects and a "taint" property can be added to each object. For example, the "document.cookie", which represents a primitive data type can be rewritten as an object, so that the result of the operation read(document.cookie) returns an object rather than a primitive string, and the object can contain extra information that identifies the result of the operation as a tainted variable.

Verification module 268 also can determine operations in the source code that act as sinks for tainted sources and transmit personal or sensitive information of a user. For example, the operation XMLHttpRequest( ) can act as a sink of personal or sensitive information. The cross-origin XML HttpRequest permission may be used to enable a web application or an extension application to request access to remote servers outside of its origin.Rewritten code of a proposed web application can be executed, and the taint property can be propagated through operations of the code as the code executes. The verification module 268 can monitor when the tainted source is passed through a sink such that information is leaked from the web application across a network. Based on evaluation of results of executing the rewritten code of the web application the verification module 268 can make an automatic determination of whether the web application violates one or more predetermined conditions (e.g., whether personal user information associated with a tainted variable is leaked from the web application across a network). Then, based on the determination of whether the web application violates one or more of the predetermined conditions the verification module 268 can associate the web application with a score. The score then can be used to automatically determine whether the web application can be a privileged static hosted web application, whether to prohibit the web application from being a privileged static hosted web application, or whether to flag the web application for manual review.

Because of the automated nature of the web application vetting process, which analyzes the dynamic behaviour of the proposed web applications, if the proposed web applications do not include code that has been predetermined to be too risky, then the proposed web applications can be a privileged static hosted web application very quickly after the developer merchant requests that the application be listed. For example, the proposed web applications can be selected as a privileged static hosted web application in less than 10 minutes, less than 5 minutes, less than 3 minutes, or less than 1 minute after the request has been received at the trusted server 260. The speed with which a web application can be listed for distribution to consumers after a developer merchant has requested that web applications be listed can provide for a satisfying experience for merchants and developers. In some implementations a requested permission associated with the web application may match one or more predetermined permissions. If the requested permission matches one or more predetermined permissions, then the proposed web application is flagged for a manual vetting process before setting the proposed web application as a privileged static hosted web application.

In some implementations, the web application may be executed for a period of time or use without permission to utilize the at least one local resource of the client device. Then, after the period of time or use, the web application may be granted permission to utilize the at least one local resource of the client device. In this way a user can grant the permissions upon developing some confidence in the security of the web application. For example, a privileged static hosted web application may be associated with editing photos. Initially, the application may not be given permission to store edited (changed) photos locally (e.g., to a local hard drive or flash drive). After the user utilizes the photo editing application for a period of time, or a number of times, the user may trust the application and give the photo editing application, as a privileged static hosted web application, permission to locally store edited (changed) photos.

As another example, the web application may be utilized for a trial period prior to, for example, purchasing the web application as a packaged web application. For example, using a digital market place (described above) a user of a client device may search for a desired web application. With a typical packaged application the user must download the entire application prior to use. This download can take a significant amount of time and/or utilize a significant amount of resources. However, with a privileged static hosted web application, the user may use the web application and decide the web application does or does not meet the user's needs. Accordingly, after trialing the webpage has a privileged, static hosted web application, the user can choose to not install the web application as a packaged application. By contrast, if the user likes the web application, the user can download and install the packaged web application version of the trialed web application. By using a privileged static hosted web application, the user can have some assurances that the privileged static hosted web application and the packaged application behave the same. This "trial" implementation may or may not include an execution of the application with a reduced or limited set of permissions to utilize local resource(s) of the client device.

As will be appreciated, the system 200 (and/or elements thereof) illustrated in FIG. 2 may be implemented as an element of and/or an extension of the generic computer device 700 and/or the generic mobile computer device 750 described below with regard to FIG. 7. Alternatively, or in addition to, the system 200 illustrated in FIG. 2 may be implemented in a separate system from the generic computer device 700 and/or the generic mobile computer device 750 having some or all of the features described below with regard to the generic computer device 700 and/or the generic mobile computer device 750.

As will be appreciated, the system 200 (and/or elements thereof) illustrated in FIG. 2 may be implemented as an element of and/or an extension of the generic computer device 700 and/or the generic mobile computer device 750 described below with regard to FIG. 7. Alternatively, or in addition to, the system 200 illustrated in FIG. 2 may be implemented in a separate system from the generic computer device 700 and/or the generic mobile computer device 750 having some or all of the features described below with regard to the generic computer device 700 and/or the generic mobile computer device 750.

Figure 7:
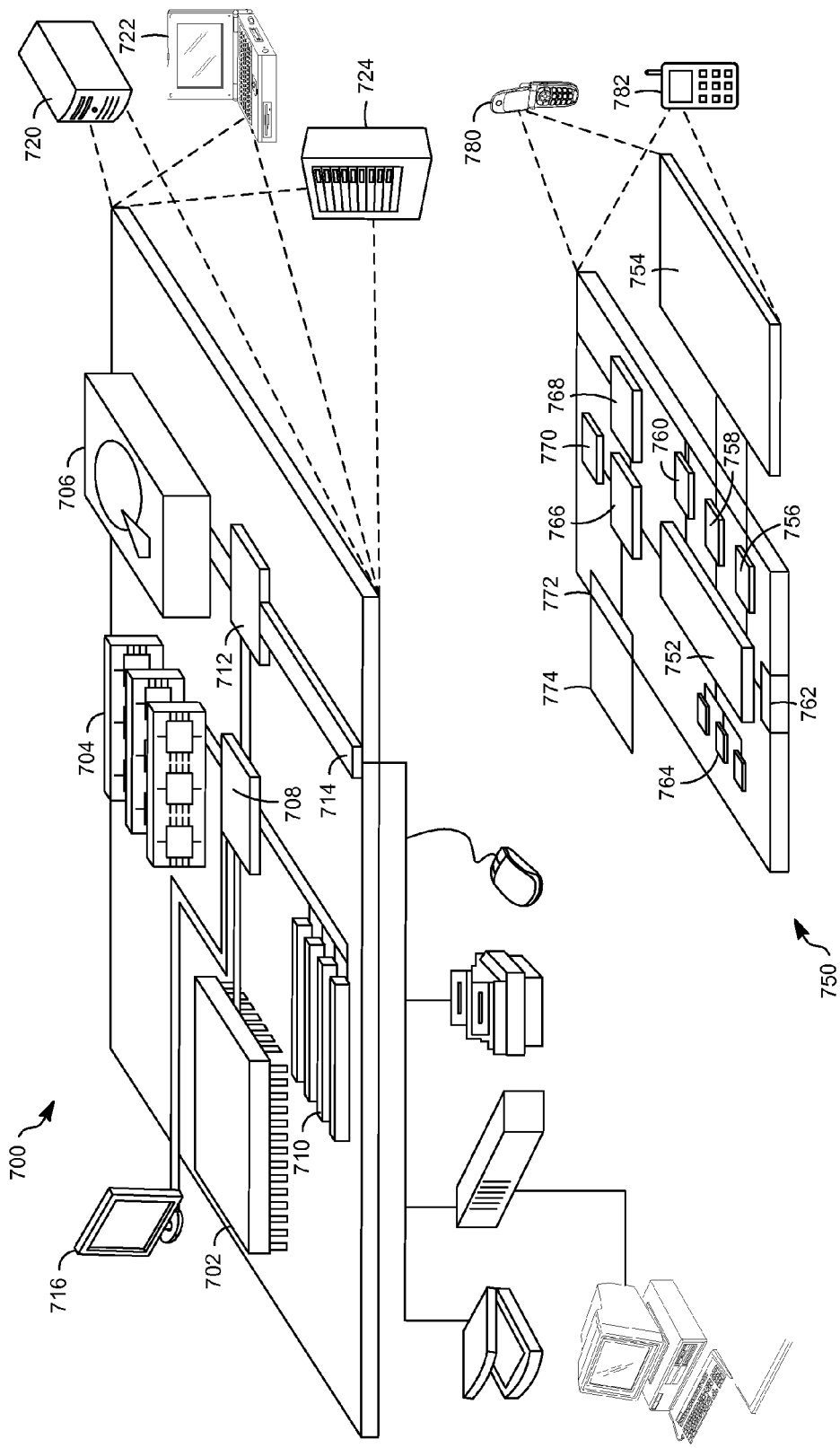
FIG. 7 is a schematic block diagram of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, LTE, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium and/or a non-transitory computer-readable storage medium. A processor(s) (e.g., a processor formed on a silicon or GaAs substrate) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether that particular combination has been specifically enumerated in the accompanying claims at this time.

What is claimed is:

1. A method comprising:
receiving a static web application at a trusted server;
validating assurance characteristics of the static web application; and
upon successful validation of the static web application, providing access to the static web application via a uniform resource locator (URL) that identifies the static web application at a trusted server location within a public Internet and that can be used to navigate to the static web application from a browser running on a client device, the browser having a first set of permissions to utilize local resources of the client device, wherein the static web application includes at least one object that is stored as a server-side component, only the at least one object is granted a second set of permissions including at least one permission additional to the first set of permissions that is not included in the first set of permissions for the at least one object to utilize local resources of the client device during execution of the static web application by the browser when the static web application is executed on the browser running on the client device, and upon receiving a change to an object of the static web application, the validating of the assurance characteristics of the static web application, as a whole, is performed before the change to the object is made accessible via the URL.

2. The method of claim 1, wherein the static web application is granted the at least one permission based on a prior verification and vetting process based on at least one permission that the web application seeks to declare.

3. The method of claim 1, wherein the static web application is granted the at least one permission based on a prior maliciousness ranking and a threshold value.

4. The method of claim 1, wherein the static web application contains all of the resources necessary to execute the application on the client computing device and wherein code needed to execute the application by the client computing device is not dynamically generated.

5. The method of claim 1, further comprising:
hosting the static web application on the trusted server, wherein the hosting includes providing access to the static web application, and code associated with the static web application, to a web crawler.

6. The method of claim 1, wherein validating assurance characteristics of the static web application includes verifying an object of the static web application does not include an object identified as at least one of a malware, a virus, and a Trojan.

7. The method of claim 1, wherein validating assurance characteristics of the static web application includes verifying a trustworthiness ranking of a developer of the static web application.

8. The method of claim 1, wherein updating the static web application includes replacing objects of the static web application with a revalidated entire application.

9. The method of claim 1, wherein prior to requesting at least one permission to utilize local resources of the client device during execution of the static web application by the browser the static web application executes, on the client device, without permission to utilize local resources of the client device.

10. A server comprising:
a memory configured to store a static web application;
a verification module configured to validate assurance characteristics of the static web application; and
an application server, upon successful validation of the static web application, configured to provide access to the static web application via a uniform resource locator (URL) that identifies the static web application at a trusted server location within a public Internet and that can be used to navigate to the static web application from a browser running on a client device, the browser having a first set of permissions to utilize local resources of the client device, wherein the static web application includes at least one object that is stored on the trusted server and served to the client device via the URL, only the at least one object is granted a second set of permissions including at least one permission additional to the first set of permissions that is not included in the first set of permissions for the at least one object to utilize local resources of the client device during execution of the static web application by the browser when the static web application is executed on the browser running on the client device, and the verification module, upon receiving a change to an object of the static web application, is further configured to repeat the validating of the assurance characteristics of the static web application, as a whole, before the change to the object is made accessible via the URL.

11. The server of claim 10, wherein the static web application is granted the at least one permission based on a prior verification and vetting process based on at least one permission that the web application seeks to declare.

12. The server of claim 10, wherein the static web application is granted the at least one permission based on a prior maliciousness ranking and a threshold value.

13. The server of claim 10, wherein the static web application contains all of the resources necessary to execute the application on the client computing device and wherein code needed to execute the application by the client computing device is not dynamically generated.

14. The server of claim 10, further comprising:
hosting the static web application on the server, wherein the hosting includes providing access to the static web application, and code associated with the static web application, to a web crawler.

15. The server of claim 10, wherein validating assurance characteristics of the static web application by the verification module includes verifying an object of the static web application does not include an object identified as at least one of a malware, a virus, and a Trojan.

16. The server of claim 10, wherein validating assurance characteristics of the static web application by the verification module includes verifying a trustworthiness ranking of a developer of the static web application.

17. The server of claim 10, wherein updating the static web application includes replacing objects of the static web application with a revalidated entire application.

18. A non-transitory computer-readable storage medium having stored thereon computer executable program code which, when executed on a computer system, causes the computer system to perform steps comprising:
receiving a static web application at a trusted server;
validating assurance characteristics of the static web application; and
upon successful validation of the static web application, providing access to the static web application via a uniform resource locator (URL) that identifies the static web application at a trusted server location within a public Internet and that can be used to navigate to the static web application from a browser running on a client device, the browser having a first set of permissions to utilize local resources of the client device, wherein the static web application includes at least one object that is stored on the trusted server and served to the client device via the URL, only the at least one object is granted a second set of permissions including at least one permission additional to the first set of permissions that is not included in the first set of permissions for the at least one object to utilize local resources of the client device during execution of the static web application by the browser when the static web application is executed on the browser running on the client device, and upon receiving a change to an object of the static web application, the validating of the assurance characteristics of the static web application, as a whole, is performed before the change to the object is made accessible via the URL.

19. The non-transitory computer-readable storage medium of claim 18, wherein the static web application is granted the at least one permission based on a prior verification and vetting process based on at least one permission that the web application seeks to declare.

20. The non-transitory computer-readable storage medium of claim 18, wherein the static web application contains all of the resources necessary to execute the application on the client computing device and wherein code needed to execute the application by the client computing device is not dynamically generated.

* * * * *